United States Patent
Radulescu et al.

(10) Patent No.: US 7,412,549 B2
(45) Date of Patent: Aug. 12, 2008

(54) PROCESSING SYSTEM AND METHOD FOR COMMUNICATING DATA

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 27 days.

(21) Appl. No.: 10/555,843

(22) PCT Filed: May 4, 2004

(86) PCT No.: PCT/IB2004/050580

§ 371 (c)(1), (2), (4) Date: Nov. 3, 2005

(87) PCT Pub. No.: WO2004/100005

PCT Pub. Date: Nov. 18, 2004

(65) Prior Publication Data

US 2006/0294263 A1 Dec. 28, 2006

(30) Foreign Application Priority Data

May 8, 2003 (EP) .................................. 03101266

(51) Int. Cl.
*G06F 13/42* (2006.01)
(52) U.S. Cl. .................. 710/106; 710/310; 709/237
(58) Field of Classification Search ............ 710/106, 710/316–317, 310; 709/236–237
See application file for complete search history.

(56) References Cited

U.S. PATENT DOCUMENTS

| 5,175,733 | A | | 12/1992 | Nugent |
| 5,922,063 | A | * | 7/1999 | Olnowich et al. ............ 710/317 |
| 6,101,194 | A | * | 8/2000 | Annapareddy et al. ...... 370/447 |
| 6,182,183 | B1 | | 1/2001 | Wingard et al. |
| 6,892,259 | B2 | * | 5/2005 | Goodrum et al. ............ 710/244 |
| 2001/0042147 | A1 | * | 11/2001 | Adams et al. ................ 710/100 |
| 2002/0138717 | A1 | | 9/2002 | Joy et al. |

FOREIGN PATENT DOCUMENTS

WO 0029961 A1 5/2000

OTHER PUBLICATIONS

Open Core Protocol Specification, International Partnership, 2.0 Release.
ISR, Written Opinion of the International Searching Authority, PCT/IB2004/050580.

* cited by examiner

*Primary Examiner*—Clifford H Knoll

(57) ABSTRACT

A method for communicating data between an initiator unit (INIT) which initiates the communication and a target unit (TRGT) is described. Therein the initiator unit (INIT) indicates a request (TID) to initiate a communication. In response the target unit (TRGT) provides information (READY, ACCEPTC) indicating whether one of the following situation exist, the initiator unit (INIT) has to maintain the request, the request of the initiator (INIT) is accepted, the request of the initiator (INIT) is rejected. In addition a processing system is described.

13 Claims, 2 Drawing Sheets

PROCESSING SYSTEM AND METHOD FOR COMMUNICATING DATA

Figure 1:
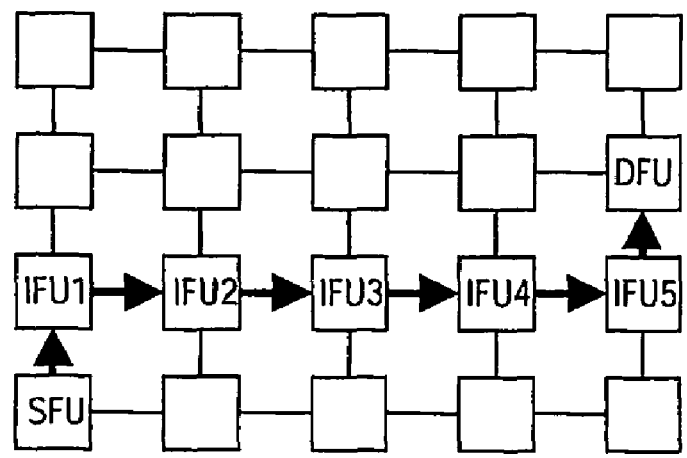

The invention relates to a processing system.

The invention further relates to a method for communicating data.

Modern on-chip interconnect protocols such as VCI and OCP introduce communication-thread identifiers to allow multiple unrelated transactions to evolve independently. On each communication thread all the transactions are ordered (i.e., requests are delivered at the slave, responses are issued by the slaves, and responses are delivered to the master in the same order the requests where issued by the master). Transactions with different communication threads do not have any ordering constraints. This allows unrelated communications to proceed independently of each other.

These protocols are defined as split protocols in that transactions are split in a request and a response. After a transmission of a request is completed from a source functional unit to the first intermediate functional unit in a communication path the source functional unit can proceed with a next transmission, instead of having to wait for a response to that request from the destination functional unit. The destination or any intermediate functional unit will start a separate arbitration procedure if necessary to give a response. A split bus protocol is more efficient when a response generation at the slave takes time (because it is pipelined, for example) or if the delivery of the request from the master to the slave takes time (as is often the case in networks). The protocols further allow pipelining, i.e. allow a master to have multiple outstanding requests (i.e., requests waiting for a response). All transactions within the same communication thread are ordered. This implies that requests are executed by the slave in the same order as the requests for those responses were issued by a master, and responses are delivered in the same order as the requests for those responses were issued by a master. Transactions with different communication threads do not have any ordering constraints.

U.S. Pat. No. 6,182,183 provides a link level protocol for exchanging the message between two subsequent functional units in the communication path from the source functional unit to the destination functional unit. According to the known protocol a master functional unit produces information, e.g. a command (Cmd), an address (Addr), or data (DataReq) and at the same time provides an identification of the thread (ReqThreadID) to which the information belongs. Likewise the slave functional unit may provide information (DataResp), and indicate the communication thread to which it belongs by an identification RespThreadID.

A functional unit can be any unit involved in a data stream for example a unit which performs operations on data, such as a CPU, a DSP or a VLIW, or a unit for storing data such as a memory, or a unit for transmitting data such as a router or an interface.

In the sequel the following denotations will be used. An initiator functional unit or initiator is a functional unit which initiates a link-level transaction with another functional unit referred to as target functional unit. According to the OSI definition at the link level, data packets are encoded and decoded into bits. It furnishes transmission protocol knowledge and management and handles errors in the physical layer, flow control and frame synchronization. A source functional unit is denoted as a functional unit which at the network level sends a message, e.g. data or a command to another functional unit, denoted as the destination functional unit. According to the OSI-definition the network layer provides switching and routing technologies, creating logical paths, known as virtual circuits, for transmitting data from node to node. Routing and forwarding are functions of this layer, as well as addressing, internetworking, error handling, congestion control and packet sequencing. A functional unit may operate as a source functional unit or as a destination functional unit depending on the circumstances.

It is a purpose of the invention to improve the known protocol. According therewith a method as defined in claim 1 and a processing system as defined in claim 6 are provided.

According to the invention the target functional unit receiving the request from the initiator functional unit to perform an action relating to a particular thread has the options to signal the initiator functional unit that 1. the initiator unit (INIT) has to maintain the request,
2. the request of the initiator (INIT) is accepted,
3. the request of the initiator (INIT) is rejected.

When the target functional unit rejects the request according to option 3, the initiator is enabled to issue a new request for another or the same communication thread. If this is accepted, a data transmission can take place which otherwise would have been delayed. In this way overall throughput is improved.

The invention is particularly suitable for application in a processor network for the following reasons. Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages. The communication network comprises a plurality of partly connected functional units. Messages from a functional unit are redirected by the functional units to one or more other functional units. Between two directly connected functional units messages relating to different communication threads may be transmitted originating from plural sources and going to plural destinations. According to the method and processing system of the invention the target functional unit has an efficient way to inform the initiator functional unit that a request for a certain thread can not be handled for some time. This enables the initiator functional unit to select another communication thread for which data transmission otherwise should have been unnecessarily delayed.

A message sent by a source functional unit may comprise a command or a packet of data. It is forwarded via one or more intermediate functional units until it arrives at the destination functional unit. The destination functional unit may on its turn send a message to the source functional unit.

These and other aspects of the invention are described in more detail with reference to the drawing. Therein FIG. 1 shows a processing system comprising plurality of functional units which are coupled in a network, FIG. 2 shows a typical way of coupling two functional units in a network according to the prior art, FIG. 3 shows a first and a second mutually coupled functional unit in a first embodiment of the invention, FIG. 4 shows a first and a second mutually coupled functional unit in a second embodiment of the invention.

FIG. 1 schematically shows a data processing system, which comprises a network connecting a plurality of functional units. The processing system is arranged to transmit data and a communication thread identifier for said data according to a split protocol along a communication path (indicated by arrows) from a source functional unit SFU to a destination functional unit DFU via one or more intermediate functional units IFU1, . . . ,IFU5. By transmitting the data together with a communication thread identifier, multiple unrelated transactions, having mutually different communication thread identifiers can evolve independently.

Figure 2:
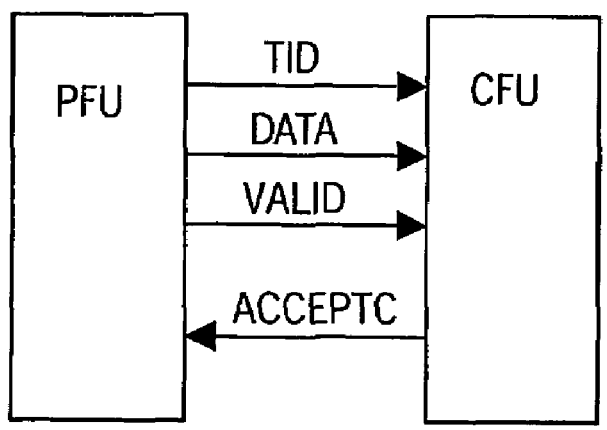

FIG. 2 shows a typical way of coupling two functional units in a network according to the prior art. Therein a data producing functional unit PFU issues a request to a data consuming functional unit CFU by activating a signal TID. This signal is indicative for the communication thread for which it attempts to transfer data. The data to be transferred is offered at a connection DATA. Validity of the indicated communication thread and the related data is indicated with a further signal VALID. As soon as the data consuming functional unit has handled the request it indicates this with a signal ACCEPTC. Until the data producing functional unit has received this signal no further transmission can take place between the two functional units. It may occur however that a request of the data producing functional unit PFU cannot be handled in time by the data consuming functional unit CFU, for example if the data consuming functional unit CFU has no buffer space left for said thread. This has the consequence however that data transmission between those functional units for all other communication threads are also delayed. In the embodiment shown it is supposed that the initiator is only capable to send data for a particular communication thread. The initiator can indicate this with the TID signal. In practice the initiator may be capable of issuing a plurality of commands, e.g. write, read, conditional write, etc. One or more command signals may be added to enable the initiator to do so, or alternatively the command may be transmitted time multiplexed via another connection, e.g. via the connection used by the TID signal. It is also possible to send only commands.

Figure 3:
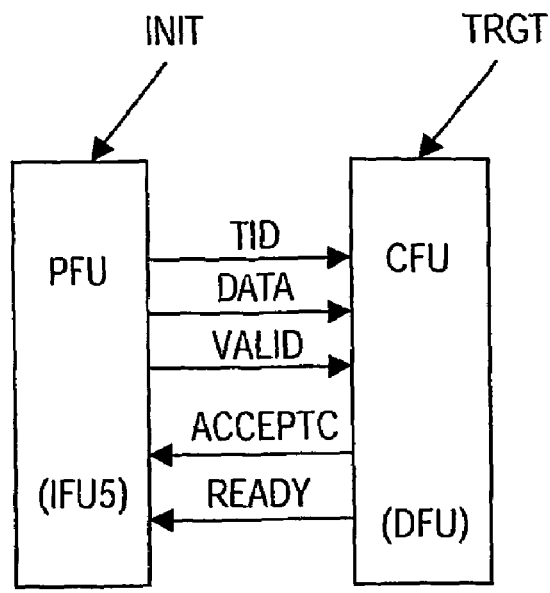
Figure 4:
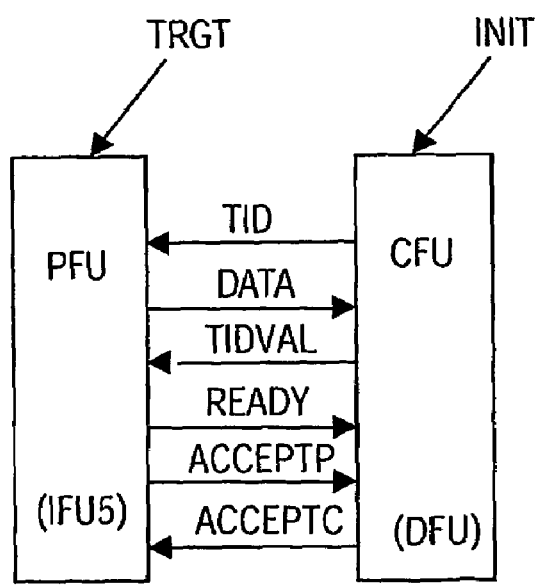

FIG. 3 shows a first and a second mutually coupled functional units in a first embodiment of a network according to the invention. A data transmission is initiated in the same way as was illustrated with reference to FIG. 2, i.e. the data producing functional unit PFU issues a request to the data consuming functional unit CFU by indicating a communication thread with a signal TID. The data to be transferred is offered at a connection DATA. Validity of the indicated communication thread and the related data is indicated with a further signal VALID. Contrary to the situation illustrated in FIG. 2 however the target functional unit, here the data consuming functional unit, has the following options:

1. Indicating the initiator unit INIT that it has to maintain the request.
2. Indicating that the request of the initiator INIT is accepted.
3. Indicating that the request of the initiator INIT is rejected.

In practice the target functional unit needs time to interpret the request and to determine whether it can be handled at that moment or not. During that time the target functional unit provides an indication according to option 1. This causes the target functional unit to hold the signals TID, DATA and VALID. As soon as the target functional unit has interpreted the request and can handle it, it indicates according to option 2. However if the target functional unit determines that the request can not be handled at that time, for example because a buffer overflow would occur for said communication thread, it signals according to option 3. This allows the initiator to withdraw the request for said communication thread and initiate a transaction for another communication thread which otherwise would have to wait until the earlier request could be handled. In this way the overall communication in the processing system is improved.

In the embodiment of FIG. 3 there is one additional signal that encodes that a link-level data exchange can proceed or it is delayed. With only one additional signal, there is only a proceed/delay feedback possible. This can be generalized to encode more elaborate feedback on why a transaction cannot proceed on a communication thread (when there are multiple causes possible: e.g., empty/full buffers, a process not expecting data on a communication thread is running on a CPU, etc.), or how long transactions can proceed on a communication thread (e.g., there is enough buffering/data to proceed with at least N transactions on a communication thread).

It is noted that a request for a particular communication thread may involve a request for sending commands, addresses and/or other data Alternatively it may involve a request for receiving commands, addresses and/or other data.

FIG. 4 shows a first and a second mutually coupled functional units in a second embodiment of a network according to the invention. Contrary to the embodiment shown in FIG. 3 now the data consuming functional unit CFU serves as the initiator INIT.

The data consuming functional unit CFU as an initiator INIT issues a request to the target, here the data producing functional unit PFU by indicating a communication thread with a signal TID. Validity of the indicated communication thread and the related data is indicated with the signal VALID. As in the embodiment shown in FIG. 3 the target functional unit has the options to 1. Indicating the initiator unit INIT that it has to maintain the request.
2. Indicating that the request of the initiator INIT is accepted.
3. Indicating that the request of the initiator INIT is rejected.

During the time necessary for determining whether the request can be handled the target functional unit responds according to option 1. If the target functional unit determines that it can handle the request on a short term it provides an indication according to option 2. However if it is determined that this impossible, for example because the required data is not expected to become available soon, the target functional unit responds according to option 3. Again this allows the initiator to withdraw the request for said communication thread and initiate a transaction for another communication thread which otherwise would have to wait until the earlier request could be handled. In this way the overall communication in the processing system is improved.

The indications according to the above-mention three options can be provided as follows using the signals READY and ACCEPTP.

| Option | READY | ACCEPTP ACCEPTC | Meaning |
|---|---|---|---|
| 1 | 0 | 0 (*) | The initiator functional unit has to continue indicating the communication thread identifier TID. |

-continued

| Option | READY | ACCEPTP ACCEPTC | Meaning |
|---|---|---|---|
| 2 | 1 | 0 | The initiator functional unit is requested to indicate an other communication thread identifier. |
| 3 | 1 | 1 | The indicated communication thread identifier is accepted. |

As long as the target functional unit is not ready, indicated by READY=0, the value of the signal ACCEPTP in the embodiment shown FIG. 3 or ACCEPTC in the embodiment of FIG. 4 is irrelevant. However, preferably the signal ACCEPTP or ACCEPTC is kept at a value indicating rejection as long as the target functional unit is not ready to decide between rejection and acceptance. This makes it possible to connect the target functional unit to a conventional initiator functional unit, having no input for receiving the signal READY. In this way the conventional initiator functional unit can normally operate, i.e. wait until the request associated with the indicated communication thread TID is, accepted, regardless whether the waiting is caused by the target functional unit evaluating the request, or because the target functional unit cannot serve the request at that moment. For clarity the logical signal values 1 and 0 were used to indicate a negative and a positive outcome respectively, e.g. ready and not ready, or acceptance or non acceptance. It is clear however that these values could also be used the other way around. Many other alternatives are possible to provide an indication according to one of these options as described in the table. For example by providing the signals READY and ACCEPTC, ACCEPTP serially along one physical connection.

It is remarked that the scope of protection of the invention is not restricted to the embodiments described herein. It is noted that information, e.g. data for a communication thread, information about a communication thread, can be exchanged between the processing units in several ways, e.g. serial, parallel or in a combination of ways.

Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A method for communicating data between an initiator unit which initiates the communication and a target unit, the method comprising the acts of:
   the initiator unit indicating a request for a communication thread having a communication thread identifier to initiate a communication;
   the target unit determining whether the request is accepted or rejected;
   the target unit determining whether the initiator unit should maintain the request; and
   the target unit providing information to the initiator unit indicating whether the request is to be maintained, the request is accepted, or the request is rejected, wherein the data is transmitted from the target unit to the initiator unit in accordance with the information, wherein the information is provided by a first signal and a second signal, the first signal indicating the target unit is either ready or not ready, and a second signal indicating the target unit either accepts or rejects the request, the second signal indicating the target unit rejects the request when the first signal indicates that the target unit is not ready.

2. The method according to claim 1, wherein the initiator unit indicates a reference (TID) to a communication thread for which it indicates the request, and wherein the initiator attempts to initiate a communication for another communication thread if the request is rejected.

3. The method according to claim 1, wherein the target unit provides a first and a second signal, the first signal indicating with a first state that the request should be maintained, and indicating with a second state that a second signal is valid, the second signal having a first state indicative that the target unit accepts the selected communication thread, the second state indicating that the initiator should abandon the request.

4. The method according to claim 1, wherein a data consuming unit functions as the initiator.

5. A processing system comprising a first functional unit and a second functional unit, the first functional unit being capable of initiating a communication with the second functional unit using a facility for exchanging signals between the functional units, the signals comprising a request signal by the first functional unit that it desires to initiate a communication, a first information signal by the second functional unit indicative of whether the first functional unit has to maintain the request, and a second information signal indicative of whether the request is accepted, or the request is rejected, wherein the second functional unit determines whether the request is accepted or rejected, wherein the second functional unit determines whether the first functional unit should maintain the request, and wherein data is transmitted from the second functional unit to the first functional unit in accordance with the information signal, wherein the second information signal is set to indicate that the request is rejected when the first information signal indicates that the first functional unit has to maintain the request.

6. The processing system according to claim 5, wherein the first functional unit indicates a reference to a communication thread for which it indicates the request, and wherein the first functional unit attempts to initiate a communication for another communication thread if the request is rejected.

7. The processing system according to claim 5, wherein the first and the second functional unit form part of a network.

8. The method according to claim 1, wherein a validity signal is provided from the initiator unit to the target unit indicating the validity of at least one of the communication thread and the data.

9. The processing system according to claim 6, wherein a validity signal is provided from the first functional unit to the second functional unit indicating the validity of at least one of the communication thread and data being transmitted from the second functional unit to the first functional unit according to the communication thread.

10. The method according to claim 1, wherein the initiator unit and the target unit are provided as part of a network formed on a chip.

11. The processing system according to claim 5, wherein the first functional unit and the second functional unit are part of a network formed on a chip.

12. The method of claim 1, further comprising the act of indicating by the initiator unit to the target unit why the request cannot be granted.

13. The processing system of claim 5, further comprising an additional signal indicating by the initiator unit to the target unit why the request cannot be granted.

* * * * *